(No Model.)
S. Q. SAUNDERS.
CAR COUPLING.
No. 475,706. Patented May 24, 1892.
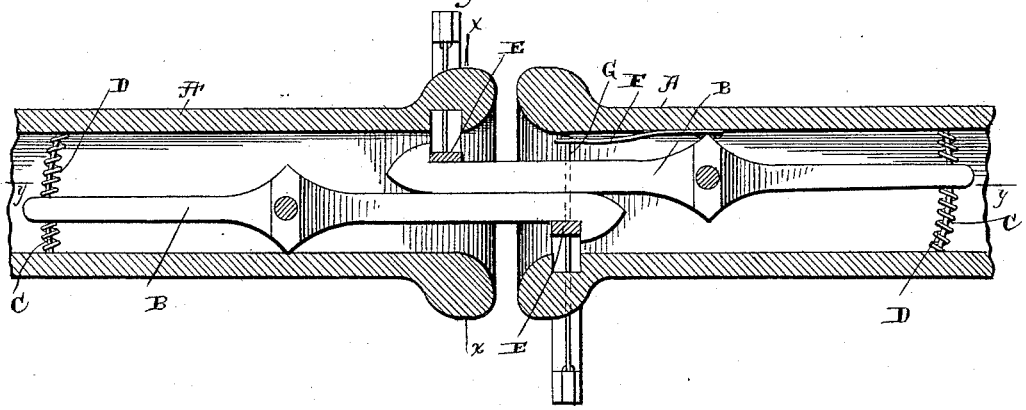
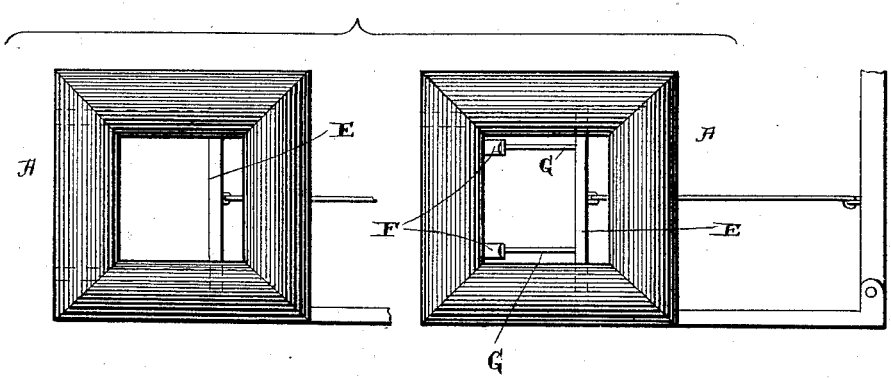
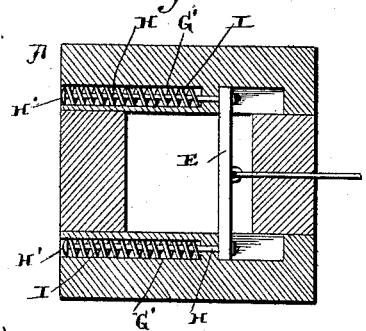
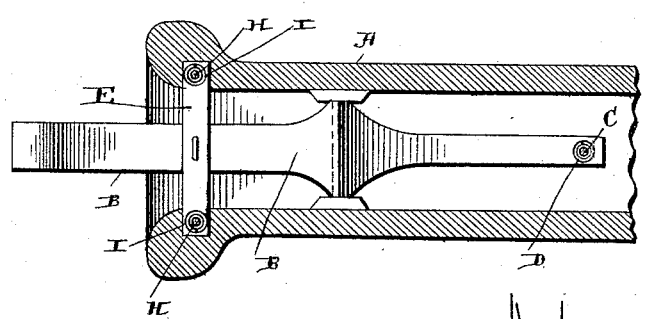
WITNESSES
Geo. E. Frick.
Rob. A. Fitzgerald.
INVENTOR
Samuel Q. Saunders
per
Lehmann Pattison Nesbit
attys

UNITED STATES PATENT OFFICE.

SAMUEL Q. SAUNDERS, OF NEW BRIDGE, OREGON.

CAR-COUPLING.

SPECIFICATION forming part of Letters Patent No. 475,706, dated May 24, 1892.

Application filed January 25, 1892. Serial No. 419,185. (No model.)

*To all whom it may concern:*

Be it known that I, SAMUEL Q. SAUNDERS, of New Bridge, in the county of Union and State of Oregon, have invented certain new and useful Improvements in Automatic Car-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in automatic car-couplings; and it consists in certain novel features of construction and in the combination and arrangement of parts, which will be fully described hereinafter, and more particularly referred to in the claims.

My invention consists more particularly in providing each of the draw-heads with an extended hook, which enters the said draw-heads of the adjacent heads when they are brought together and in which they are held by laterally-sliding latches, which are held normally in engagement with the said hooks by coiled or flat springs.

Referring to the accompanying drawings, Figure 1 is a plan view of my improved coupler, the tops of the draw-heads being removed, and in which two forms of latch-springs are shown. Fig. 2 is a front view of the draw-heads shown in Fig. 1. Fig. 3 is a sectional view on the line X X of Fig. 1. Fig. 4 is a similar view on the line Y Y.

A represents the draw-heads, which may be of ordinary or any preferred construction, and B the coupler-hooks, which are pivoted between their ends within the said heads, as shown.

Secured across the rear of the draw-head cavity is the arc-shaped guide C, upon which the rear end of the hook B moves in its pivotal motion. Placed on this guide and on opposite sides of the said rear end of the hook are the coiled springs D, which hold the said end in the center of the cavity and in a line with the draw-head.

E represents the laterally-moving stops or latches which are placed in the forward ends of the draw-heads. These latches are drawn outward from the nearest adjacent walls of the recesses by springs located within the draw-heads, and by this means they are held in engagement with the projecting hooks B, as shown in Fig. 1. Two forms of spring are here shown for holding the stop or latch thus extended. In one of these constructions I employ a flat spring F, which is secured to the opposite wall of the recess from the latch, and its free end is connected thereto by links G, thus drawing the said latch outward and in engagement with the adjacent extended hook. In the other construction, which is illustrated in Fig. 4, two horizontal guideways G' are formed within the draw-head above and below the pivoted hook. Extending outward from the opposite ends of the latch and into the respective ways are the rods H, provided with stops H' on their outer ends. Placed within the ways and confined therein by the rods are the coiled springs I, which, pushing against the said stops on the rods, hold the latch normally in an extended position and in engagement with the adjacent projecting hook B. For moving laterally the latches I provide an outwardly-extending rod or chain, which is connected to a pivoted operating-lever, which may be mounted either on the outer side of the draw-head or on the car-body, as may be preferred.

I do not wish to limit myself to either form of spring for the latch, as the one most preferred may be used without departing from the spirit of my invention.

The operation of coupling is as follows: When the cars are brought together, the hooks enter the adjacent draw-heads, and their wedge-shaped points shove the laterally-moving catches F outward until the hooks have passed the said catches, when the latter will spring back into their normal positions, engaging the hooks. The connection is thus made complete and can only be broken by moving the latches outward in the above-described manner.

Having thus described my invention, I claim—

1. In an automatic car-coupling, the combination, with the draw-head, of a projecting hook pivoted therein, a means for holding the hook normally in a line with the draw-head, and a laterally-moving catch, substantially as shown and described.

2. In an automatic car-coupling, the combination, with the draw-head, of a hook pivoted therein, having a rearwardly-extending end, a guide secured within the draw-head, upon which the said end moves, springs mounted on said guide, and a laterally-moving spring-actuated catch, substantially as shown and described.

3. In an automatic car-coupling, the combination, with the draw-head and a hook pivoted therein, of a laterally-moving catch moving in recesses formed in the upper and lower walls of the draw-head, and springs which hold the said catch extended toward the center of the draw-head, substantially as shown and described.

4. In an automatic car-coupling, the combination, with the draw-head and a hook pivoted therein, of a laterally-moving catch, horizontal rods extending from the upper and lower ends of said catch, springs mounted on the said rods, and stationary bearings against which the rear ends of the springs rest and through which bearings the rods freely pass, substantially as shown and described.

In testimony whereof I affix my signature in presence of two witnesses.

SAMUEL Q. SAUNDERS.

Witnesses:
G. B. SAUNDERS,
T. R. LEE.